United States Patent [19]

Mroz

[11] Patent Number: 4,562,505
[45] Date of Patent: Dec. 31, 1985

[54] FLEXIBLE MAGNETIC MEMORY DISK WITH METALLIC HUB AND METHOD OF MANUFACTURING SAME

[75] Inventor: Edward Mroz, Menlo Park, Calif.
[73] Assignee: Verbatim Corporation, Sunnyvale, Calif.
[21] Appl. No.: 451,104
[22] Filed: Dec. 20, 1982
[51] Int. Cl.⁴ .................................................. G11B 5/82
[52] U.S. Cl. ..................................................... 360/135
[58] Field of Search ............................ 360/135, 97–99, 360/104–105; 365/55; 219/121 LC, 121 LD

[56] References Cited

U.S. PATENT DOCUMENTS 4,224,648  9/1980  Roling ............................. 360/135 X
4,317,150  2/1982  Gruss et al. ...................... 360/99 X

FOREIGN PATENT DOCUMENTS 54-36706  3/1979  Japan ..................................... 360/135

Primary Examiner—John H. Wolff
Attorney, Agent, or Firm—Thomas E. Schatzel

[57] ABSTRACT

A disk has a central aperture and a metallic hub has an annular flange abuting one side of the disk. A boss projects from the annular flange through the central aperture. A retainer ring fits about the boss and abuts the side of the disk opposite from the annular flange. A plurality of laser welds extend between the annular flange and the retainer ring to bond the disk in place therebetween.

10 Claims, 6 Drawing Figures

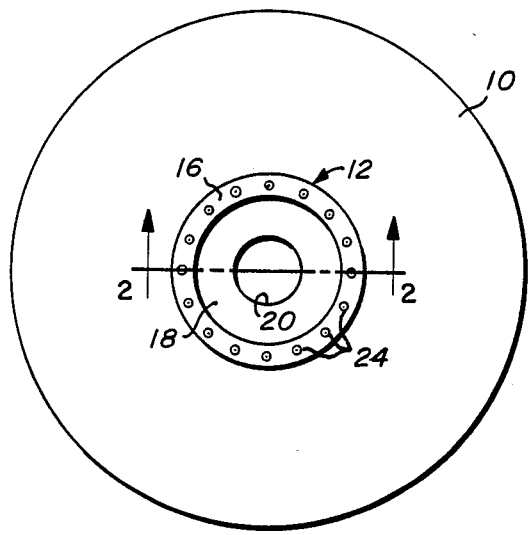
Fig_1
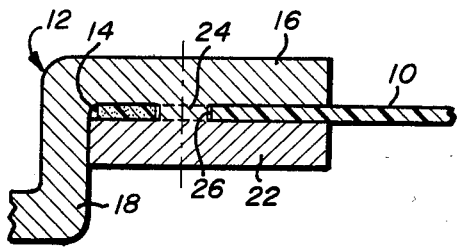
Fig_3
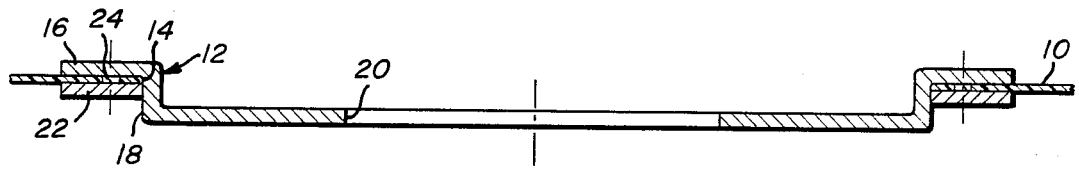
Fig_2
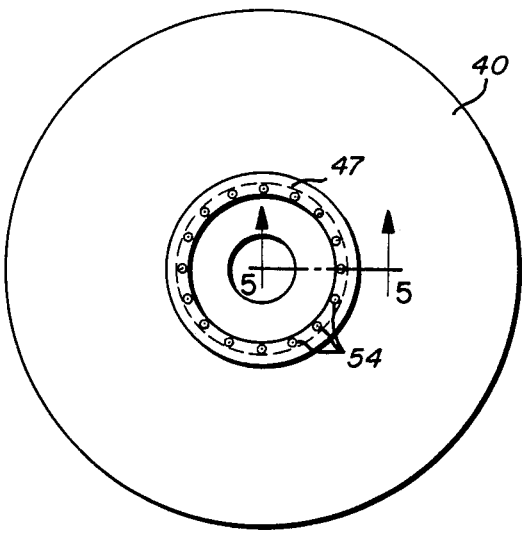
Fig_4
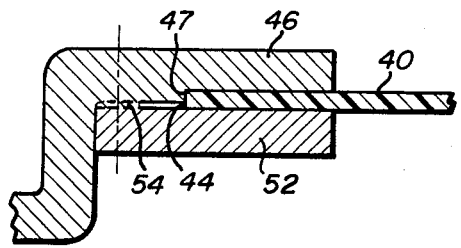
Fig_6
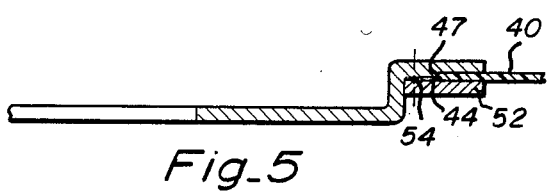
Fig_5

FLEXIBLE MAGNETIC MEMORY DISK WITH METALLIC HUB AND METHOD OF MANUFACTURING SAME

BACKGROUND OF THE INVENTION

1. Field of the Invention

This invention relates generally to the field of magnetic memory disks for data storage. More specifically, it relates to a flexible disk with a metallic hub and to a method of manufacturing the same.

2. Description of the Prior Art

A floppy disk has a thin flexible substrate made of polyethylene teraphalate or similar material that is coated on one or both sides with a suitable magnetic oxide. The thickness of the substrate is about three thousandths of an inch. The disk is used as the data storage medium in a floppy disk unit. The disk has a central aperture that is adapted to receive a spindle for rotating the disk within a protective jacket. Openings are provided in the jacket for receiving the spindle, for enabling a read/write head access to the magnetic surface of the disk, and for enabling a photosensor to indicate to a control program the location of an index hole for determining the relative angular relationship between record data on the disk and the read/write head. A clamping device is positioned opposite the free end of the spindle for pressing the disk onto the rotating spindle in positive engagement to quickly bring the disk up to operating speed.

It is desirable to have the flexible disk concentrically mounted on the spindle, but manufacturing and mounting tolerances introduce some eccentricity. Furthermore, each time the disk is mounted on the spindle, the disk portion adjacent the central aperture is subjected to wear and damage that is cumulative. After several cycles of operation, the central aperture becomes eccentric relative to data tracks that ideally were concentric with the central aperture when recorded. Such eccentricity causes misalignment between the data tracks and the read/write head. When data is recorded on a disk that is mounted eccentrically to the spindle, the resulting data tracks are non-circular, and this causes reading errors during subsequent use of the disk.

While the afore-mentioned alignment problems cause errors for disks having a conventional number of data tracks per radial inch, these problems become more critical for the new micro-disks that have an increased track density. Some conventional disks had no reinforcement adjacent the central aperture, and the substrate material held up for the wear life of the disk. U.S. Pat. No. 4,052,750 of Barber, et al, shows a disk having an annular reinforcement member concentrically arranged adjacent the central mounting aperture, on one or both sides of the disk. The reinforcement member is cemented to the disk. The use of cement, glue or adhesives make the manufacturing somewhat cumbersome. There are problems of contamination and special care must be taken to maintain cleanliness. U.S. Pat. No. 3,729,720, of Darling, et al, shows a recording disk with a mounting hub in the form of two parts that are clamped on opposite sides of the disk by fingers extending from one part through the central aperture of the other part. When two parts are clamped together by crimping, quality control is a problem. Close tolerances are required to obtain the right clamping force. Thermoexpansion can jeopardize the clamping strength and allow the disk to work loose with no visible effect but resulting in recording errors.

U.S. Pat. No. 3,586,816, of Hagen, discloses a laser spot welding system and method for producing a series of microscopic spot welds in a specific array. U.S. Pat. No. 3,769,117, of Bowen, et al, and U.S. Pat. No. 3,868,490, of Jean-Phillippe Aeschlimann, et al, show further applications of laser welding.

SUMMARY OF THE PRESENT INVENTION

An object of the present invention is to mount a flexible disk to a metallic hub in a manner that maximizes the bond between the disk and the metallic hub.

Another object of the invention is to mount a disk to a metallic hub in a manner that minimizes distortion of the disk.

A further object of the invention is to provide a method of manufacturing a disk with a metallic hub by laser welding.

In accordance with the present invention, there is provided a magnetic memory disk having a plastic disk with a metallic hub. The plastic disk has a magnetic recording medium on at least one side thereof and a central aperture. The metallic hub has an annular flange that abuts one side of the disk adjacent the central aperture. A boss projects axially from the annular flange through the central aperture. A retainer ring fits about the boss and abuts the side of the disk opposite from the annular flange. A plurality of laser welds extend between the annular flange and the retainer ring that are spaced apart by the disk.

In a preferred embodiment of the invention, there is provided a method of manufacturing a plastic disk with a metallic hub wherein the plastic disk has a magnetic recording medium on at least one side thereof and a central aperture. This method includes the steps of positioning an annular flange in abutment with one side of the disk adjacent the central aperture and with a boss projecting axially from the annular flange through the central aperture, positioning a retainer ring that fits radially about the boss in abutment with the side of the disk opposite from the annular flange, and directing a plurality of laser beams towards the annular flange and the retainer ring that are spaced apart by the disk to form a plurality of laser welds simultaneously therebetween.

Among the advantages of the present invention are maximized bond between the plastic disk and the metallic hub, minimized distortion of the disk, and joining elements of the metallic hub on opposite sides of the disk by laser welding.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a plan view of a disk with a metallic hub embodying the present invention;

FIG. 2 is an enlarged section in elevation taken on the line 2—2 of FIG. 1;

FIG. 3 is a detail view of the laser weld between the annular flange and the retainer ring through a hole in the disk;

FIG. 4 is a plan view of a disk with a metallic hub representing a modified form of the invention;

FIG. 5 is an enlarged section in elevation taken on the line 5—5 of FIG. 4; and

FIG. 6 is a detail view of the laser weld between the annular flange and the retainer ring for the embodiment shown in FIG. 4.

DETAILED DESCRIPTION OF THE PREFERRED EMBODIMENT

Looking now at FIG. 1, a disk 10 is shown mounted to a metallic hub indicated by general reference numeral 12. The disk is a thin, flexible plater made of polyethylene terraphalate or similar material that is coated on one or both sides with a suitable magnetic oxide. The thickness of the disk is about three thousandths (0.003) of an inch. The disk has a circular central aperture 14, shown in FIGS. 2 and 3, for receiving the metallic hub. An annular flange 16 abuts one side of the disk, and a boss 18 projects axially from the annular flange through the central aperture of the disk. A spindle hole 20 extends axially through the boss. A retainer ring 22 fits radially about the boss and abuts the side of the disk opposite from the annular flange. The annular flange and the retainer ring are held together on opposite sides of the disk by a series of laser welds 24 that are aligned in s circular pattern concentric with the hub. During the laser welding, holes 26 are formed in the disk by melting about the welds. The welds are about 0.020 of an inch in diameter and the holes are slightly larger. The annular flange, boss and retainer ring that form the metallic hub are preferably made of stainless steel having a thickness of approximately 0.010 of an inch.

To manufacture the disk 10 with the metallic hub 12, the annular flange 16 is positioned in abutment with one side of the disk at a location adjacent the central aperture 14. The boss 18 projects axially from the annual flange through the central aperture. The retainer ring 22 is positioned in abutment with the side of the disk opposite from the annular flange. A plurality of laser beams are directed towards the annular flange and the retainer ring to form laser welds 24 therebetween. During the welding, holes 26 are melted in the disk with the laser beams enabling welding between the annular flange and the retainer ring.

A second embodiment of the invention is illustrated in FIGS 4–6. This embodiment is similar to the embodiment previously described with the exceptions that a disk 40 has a central aperture 44 of somewhat larger diameter than central aperture 14 and an annular flange 46 is stepped axially at an intermediate radial location 47 to abut both one side of the disk and the axial surface adjacent the central aperture of the disk. A retainer ring 52 and the annular flange are held together on opposite sides of the disk by a series of laser welds 54 that pass through the central aperture of the disk. The axial step in the annular flange minimizes the spacing between the annular flange and the retainer ring at the laser welds. Since the welds pass through the central aperture of the disk, the disk is not melted during welding. Sufficient space is provided for receiving the disk, and after welding, the disk is firmly gripped between the annular flange and the retainer ring. While the disclosed embodiment shows the axial step in the annular flange, the same result could be achieved by providing the axial step in the retainer ring.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. In a magnetic memory disk having a plastic disk with a magnetic recording medium on at least one side thereof and a central aperture, a metallic hub for reinforcing the plastic disk adjacent the central aperture, said hub including:
    an annular flange that abuts one side of the disk adjacent the central aperture;
    a boss that projects axially from the annular flange through the central aperture;
    a retainer ring that fits about the boss and abuts the side of the disk opposite from the annular flange; and
    the improvement comprising a plurality of laser welds extending between the annular flange and the retainer ring that are spaced apart by the disk.

2. The magnetic memory disk described in claim 1 wherein said hub is made of stainless steel.

3. The magnetic memory disk described in claim 1 wherein said plurality of laser welds extending between the annular flange and the retainer ring are aligned in a circular pattern concentric with the hub.

4. The disk with a metallic hub described in claim 1 wherein said disk has a plurality of holes therein and each laser weld extends through a separate hole in the magnetic memory disk.

5. The magnetic memory disk described in claim 1 wherein each laser weld extends through the central aperture of the disk between the annular flange and the retainer ring.

6. The magnetic memory disk described in claim 5 wherein said annular flange is stepped axially at an intermediate radial location to abut one side of the disk and the axial surface of the disk adjacent the central aperture.

7. The magnetic memory disk described in claim 5 wherein there is at least one axially stepped surface at a radial location between the laser welds and the disk to minimize the spacing between the annular flange and the retainer ring at the laser welds while providing sufficient space for the disk to be firmly gripped between the flange and the ring.

8. The magnetic memory disk described in claim 1 wherein said laser welds have a diameter of approximately one hundredth of an inch and said annular flange and said retainer ring have thicknesses of approximately one hundredth of an inch.

9. A method of manufacturing a magnetic memory disk having a plastic disk with a central aperture that is reinforced by a metallic hub including an annular flange, a boss that projects axially from the annular flange, and a retainer ring that fits radially about the boss, said method comprising the steps of:
    positioning the annular flange in abutment with one side of the disk adjacent the central aperture and with the boss projecting axially from the annular flange through the central aperture;
    positioning the retainer ring radially about the boss in abutment with the side of the disk opposite from the annular flange; and
    directing a plurality of laser beams towards the annular flange and the retainer ring that are spaced apart by the disk to form a plurality of laser welds simultaneously therebetween.

10. The method of manufacturing described in claim 9 including the steps of melting holes in the plastic disk with the laser beams for enabling welding between the annular flange and the retainer ring.

* * * * *